(12) United States Patent
Kosaka et al.

(10) Patent No.: US 7,260,531 B2
(45) Date of Patent: Aug. 21, 2007

(54) INTERACTIVE SYSTEM, METHOD, AND PROGRAM PERFORMING DATA SEARCH USING PRONUNCIATION DISTANCE AND ENTROPY CALCULATIONS

(75) Inventors: Tetsuo Kosaka, Yonezawa (JP); Hiroki Yamamoto, Kanagawa (JP); Kenichiro Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 866 days.

(21) Appl. No.: 10/376,318

(22) Filed: Mar. 3, 2003

(65) Prior Publication Data
US 2003/0220793 A1 Nov. 27, 2003

(30) Foreign Application Priority Data
Mar. 6, 2002 (JP) ............................. 2002-060900

(51) Int. Cl.
*G10L 15/28* (2006.01)
(52) U.S. Cl. ..................... 704/255; 704/270
(58) Field of Classification Search ............... 704/252, 704/270
See application file for complete search history.

(56) References Cited

U.S. PATENT DOCUMENTS

| | | | | |
|---|---|---|---|---|
| 5,033,087 A | * | 7/1991 | Bahl et al. ................ 704/256.5 |
| 5,893,902 A | * | 4/1999 | Transue et al. .............. 704/275 |
| 5,940,793 A | * | 8/1999 | Attwater et al. ............. 704/231 |
| 6,226,611 B1 | * | 5/2001 | Neumeyer et al. ........... 704/246 |
| 6,256,630 B1 | * | 7/2001 | Gilai et al. ...................... 707/6 |
| 6,470,337 B1 | | 10/2002 | Nihei |
| 6,477,500 B2 | * | 11/2002 | Maes .......................... 704/275 |
| 6,513,037 B1 | * | 1/2003 | Ruber et al. ..................... 707/5 |
| 6,665,640 B1 | * | 12/2003 | Bennett et al. .............. 704/257 |
| 6,847,931 B2 | * | 1/2005 | Addison et al. ............. 704/260 |

FOREIGN PATENT DOCUMENTS

| | | |
|---|---|---|
| JP | 5-101100 | 4/1993 |
| JP | 11-306195 | 11/1999 |
| JP | 2000-194722 | 7/2000 |
| JP | 2002-24256 | 1/2002 |

* cited by examiner

*Primary Examiner*—Michael N Opsasnick
(74) *Attorney, Agent, or Firm*—Fitzpatrick, Cella, Harper & Scinto (57) ABSTRACT

Disclosed are an interactive system and method of controlling the same for achieving a task more efficiently. Items of data to be searched are stored in a memory (107) in a form classified according to prescribed classes, and a dialog controller (102) decides the order in which questions are presented to a user in order to narrow down the object of a search to data in a specific class. The questions are then presented to the user in the decided order by a question generator (103).

3 Claims, 6 Drawing Sheets

FIG. 5

INTERACTIVE SYSTEM, METHOD, AND PROGRAM PERFORMING DATA SEARCH USING PRONUNCIATION DISTANCE AND ENTROPY CALCULATIONS

FIELD OF THE INVENTION

This invention relates to an interactive system and method of controlling same for achieving the tasks of information retrieval and a reservation service, etc., interactively.

BACKGROUND OF THE INVENTION

Interactive systems have been proposed for retrieving information or operating applications interactively by inputs from a keyboard or by input of voice. Such a system will be described taking as an example a recording programming system based upon spoken dialog utilizing voice recognition technology. If the name of a program desired to be preselected for recording is known exactly, then the name of the program can be preselected by voicing the name directly. For example, preselection programming can be performed through dialog of the following kind:

System: Say the name of the program you wish to preselect for recording.
User: News Ten (the name of the program).
System: Do you want to preselect "News Ten"?
User: Yes.

The objective can be attained by this give-and-take. In a case where the name of the program is not known exactly, the objective can be attained by voice entering the program attribute such as channel or broadcast time period and narrowing the candidates using the program attribute as a search key. The following is an example:

System: What is the time of the program you wish to preselect for recording?
User: 9:00 PM.
System: What is the name of the channel of the program you wish to preselect for recording?
User: Channel 11, Tokyo.
System: There are two programs at 9:00 PM on Channel 11, Tokyo. Do you wish to preselect Drama XX?
User: No.
System: Do you wish to preselect Weather Information?
User: Yes.

Thus there has been proposed an interactive system which, at the initiative of the system, narrows down the number of search items in stages by having the user answer questions posed by the system, thereby attaining the objective.

In a system-driven interactive system of the above-described kind, generally an expected value of the number of search items that will prevail after being narrowed down is utilized as selection criteria of questions for narrowing down the objects of the search. However, it is hard to narrow down efficiently by only using the expected value.

The above will be described taking the preselection of television programs for recording as an example.

First, assume a case where the TV programs are narrowed down by their broadcast times (e.g., two time periods, namely AM and PM). For example, for 200 TV programs, if the number of programs in the AM period is 100 and the number in the PM period is 100, then the next number of items searched can be narrowed down from 200 to 100 by asking whether the desired program is in the AM or PM period.

Next, assume a case where TV programs are narrowed down by category (e.g., two categories, namely news programs and other programs other than news programs). For example, for 200 programs, if the number of programs belonging to the first category (news) is 100 and the number of programs belonging to the second category (other than news) is 100, then the next number of items searched can be narrowed down from 200 to 100 by asking a single question in a manner similar to that above.

However, a problem arises if the numbers of programs belonging to the respective categories differ greatly from each other. For example, with regard to 200 programs, consider a case where there is only one program that belongs to the first category and 199 programs that belong to the second category. In this case, the expected value of the number of items to be searched after the question relating to category is answered is 100, which is no different from the above example. If it so happens that a news program has been specified by a single question, then the program can be finalized by this single question. In a case other than this, however, the 200 items to be searched is diminished by only one and, hence, there is little narrow-down effect. This means that a greater number of questions will be necessary, resulting in a longer time for the search.

With regard to voice recognition techniques, recognition performance varies depending upon the question because the recognition vocabulary available as candidates for answers differs depending upon the question presented to the user. Accordingly, in a case where a question in which an answer candidate contains similar words that are difficult to recognize is presented at the start, confirmation is laborious owing to erroneous recognition and, in the end, the search requires a long period of time.

For example, assume that the number of items to be searched is narrowed down from 200 to 100 by answering the question regarding AM or PM. Further, assume that the number of items to be searched is similarly narrowed down from 200 to 100 by answering the question relating to category.

In this case, the expected value and the systematic error are both the same and therefore one may consider that no problem will arise regardless of which approach is adopted. However, if the spoken answer to the AM/PM question and the spoken answer to the category-related question are compared, it will be seen that the former contains many words of similar pronunciation whereas the latter contains few words of similar pronunciation. In other words, a difference in pronunciation-related features appears. When misrecognition based upon voice recognition is taken into account, it will be understood that the number of items to be searched that can be narrowed down differs depending upon the nature of the question asked.

SUMMARY OF THE INVENTION

Accordingly, an object of the present invention is provide an interactive system and method of controlling same for achieving a task more efficiently.

According to the present invention, the foregoing object is attained by providing an interactive system for achieving a prescribed task by conducting a data search based upon information exchanged interactively, comprising: voice recognition means for recognizing voice entered as the information exchanged interactively; storage means for storing each item of data, as an object of a search, classified to prescribed classes on the basis of a plurality of classification criteria; decision means for deciding an order in which questions are presented for the purpose of narrowing down the object of a search to data in a specific class; and presentation means for presenting questions in the order that has been decided by the decision means.

Further, according to the present invention, the foregoing object is attained by providing a method of controlling an interactive system for achieving a prescribed task by conducting a data search based upon information exchanged interactively, comprising: a voice recognition step for recognizing voice entered as the information exchanged interactively; a storage step of storing each item of data, as an object of a search, classified to prescribed classes on the basis of a plurality of classification criteria; a decision step of deciding an order in which questions are presented for the purpose of narrowing down the object of a search to data in a specific class; and a presentation step of presenting questions in the order that has been decided at the decision step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DETAILED DESCRIPTION OF THE PREFERRED EMBODIMENTS

The Inventor has found that the above-described problems occur in the conventional interactive system because the order in which questions are presented is fixed. The embodiments of the present invention raise the effectiveness with which the items to be searched are narrowed down by controlling the order in which questions are presented.

Preferred embodiments of the present invention will now be described in detail with reference to the drawings.

First Embodiment

Figure 1:
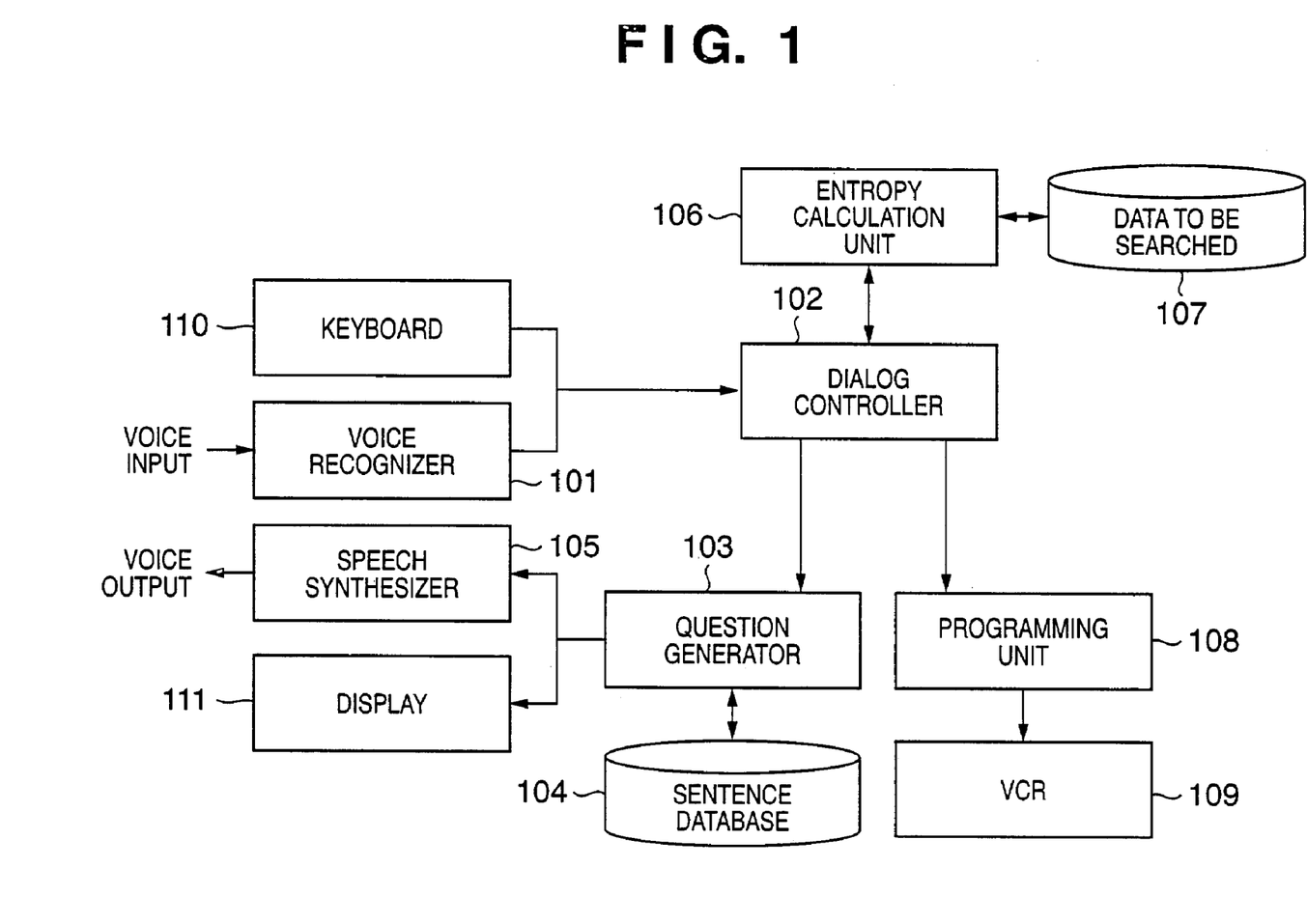
FIG. 1 is a block diagram illustrating the configuration of an interactive system according to a first embodiment of the present invention.

FIG. 1 is a block diagram illustrating the configuration of an interactive system according to a first embodiment of the present invention.

The present system includes a VCR 109 for receiving and recording, e.g., a television broadcast, and a programming unit 108 for preselecting what is to be recorded and controlling the recording operation of the VCR 109. Preselection is performed interactively.

A keyboard 110 is operated by the user to enter information. The system further includes a voice recognizer 101 to which the user's voice is input and recognized in order to enter the same information. The user can enter information using the keyboard 110 and by voice using the voice recognizer 101.

A memory 104 stores a question database so adapted that question candidates presented to a user can be searched. Based upon the question database, a question generator 103 generates a question to be presented. The question generated by the question generator 103 is displayed on a display unit 111, but it is also possible for the question to be sent to a speech synthesizer 105 and output as voice by speech synthesis.

A memory 107 stores data to be searched. An entropy calculation unit 106 calculates entropy, on a per-class (described later) basis, of search data stored in the memory 107. A dialog controller 102 performs dialog control based upon an output from the entropy calculation unit 106.

Figure 2:
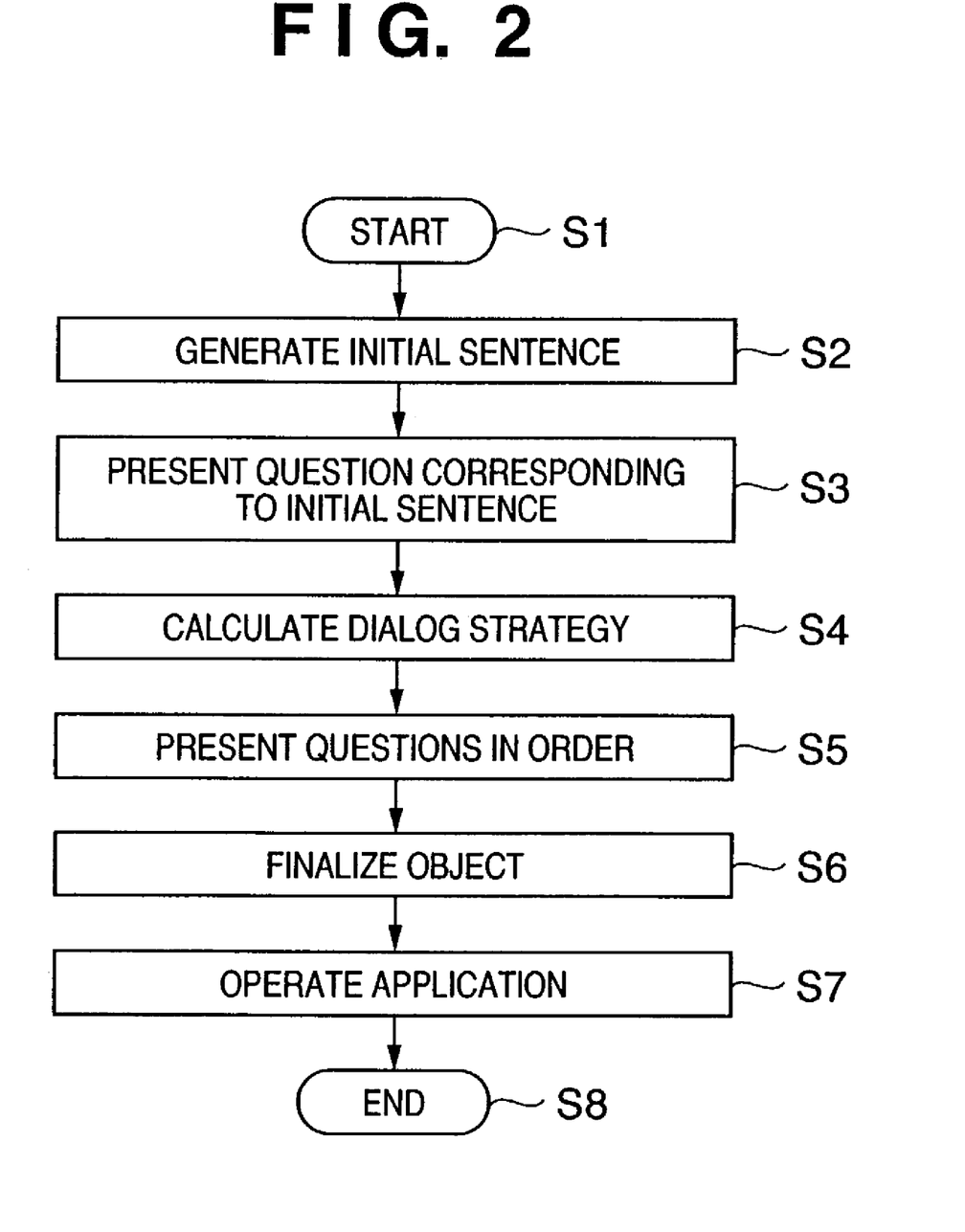
FIG. 2 is a flowchart illustrating the operation of the interactive system according to the first embodiment.

FIG. 2 is a flowchart illustrating operation of the interactive system according to this embodiment.

When operation of the system starts (step S1), an initial sentence is generated at step S2. This is generated by the dialog controller 102. The question generator 103 generates a specific utterance, e.g., "YOU MAY NOW START PROGRAMMING". The content of this utterance has been stored in the sentence database 104. The initial sentence generated by the dialog controller 102 is expressed in an abstract format (e.g., "init-sentence"). This is sent to the question generator 103. The latter retrieves the data corresponding to "init-sentence" from the sentence database in the memory 104 and acquires the specific content of the utterance. It should be noted that a change to another utterance can be made by changing the content of the sentence database.

Next, at step S3, the content of the utterance generated by the question generator 103 undergoes speech synthesis in the speech synthesizer 105 and is then presented to the user. The method of presentation may be by voice utilizing the speech synthesizer 105 or by display on the display unit 111 without speech synthesis. Of course, both the speech synthesizer 105 and display unit 111 may be used together.

After the question corresponding to the initial sentence is presented to the user, a strategy regarding the order in which questions are to be presented is devised at step S4. This is carried out by the dialog controller 102 based upon the result of calculation by the entropy calculation unit 106. The details of calculation regarding the dialog strategy performed at step S4 will now be described with reference to the flowchart of FIG. 3.

Figure 3:
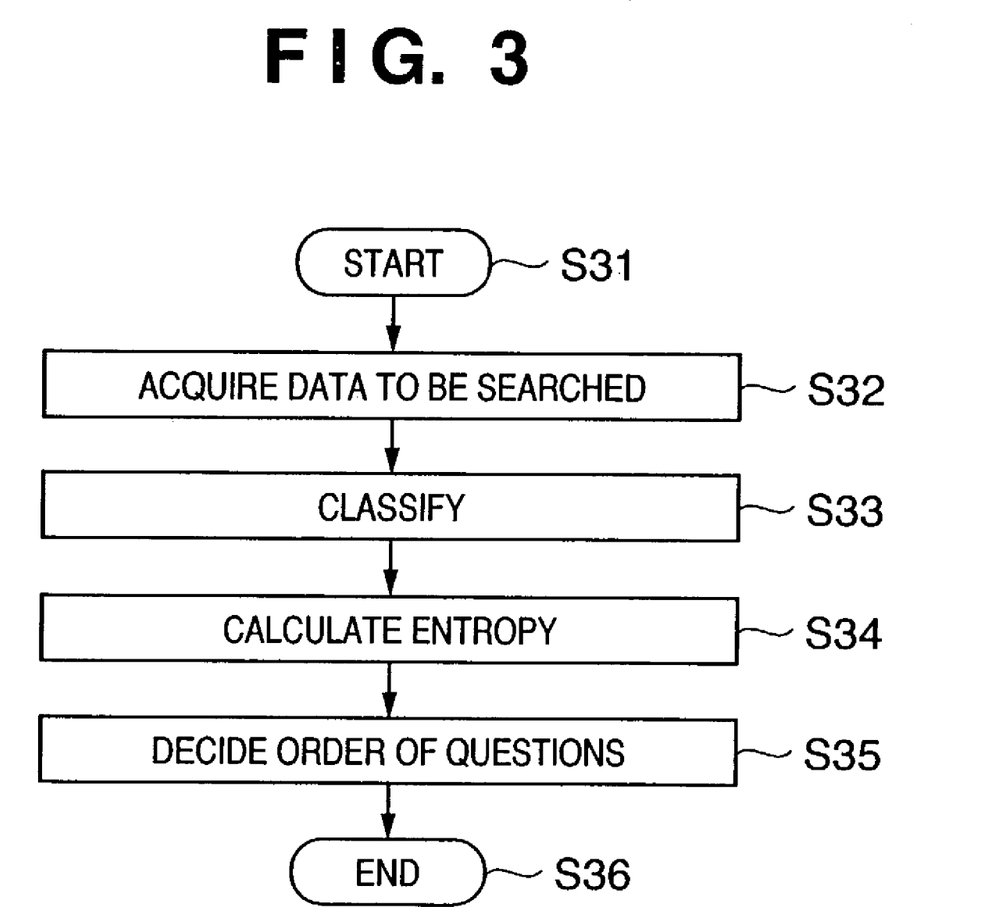
FIG. 3 is a flowchart illustrating an example of processing for calculating a dialog strategy according to the first embodiment.

First, at step S32, the data that is the object of a search is acquired from the memory 107. This data according to the present embodiment corresponds to a listing of programs. Words representing program attribute (attribute words) such as broadcast times (starting time and end time), channel and category, are appended to each program.

Next, at step S33, each program is classified on the basis of each attribute based upon the attribute words. For example, with regard to the broadcast time period as the attribute, programs are classified into programs of the five o'clock period (the attribute word is "five"), six o'clock period (the attribute word is "six"), and so on. Classification is performed in similar fashion with regard to the other attribute such as channel and category.

Next, at step S34, the entropy calculation unit 106 performs an entropy calculation for every class based upon the result of classification made at step S33. The entropy calculation is performed as follows, by way of example.

Let Ntotal represent the total number of program candidates, C(j) the class classified according to attribute j, i(j) each class in class C(j) (ie. classified according to attribute j.), Nclass(i(j)) the number of programs that belong to class i(j), and I(j) the total number of classes in class C(j). Entropy H(C(j)) in class C(j) is calculated as follows:

$$H(C(j)) = \sum_{i(j)=1}^{I(j)} -\frac{Nclass(i(j))}{Ntotal} \log_2 \frac{Nclass(i(j))}{Ntotal} \quad (1)$$

Next, at step S35, the entropies H (c(j)) of the respective classes C(j) are compared in size based upon the result of calculation at step S34 and the question presenting order is decided so the questions are presented in order of classes of decreasing entropy. This ends the calculation of dialog strategy.

It should be noted that the calculation of dialog strategy at step S4 may be executed at any time, such as when the system is booted up, regardless of the sequence shown in the flowchart of FIG. 2 so long as this is done before the user performs program preselection. Furthermore, the dialog strategy at step S4 may be recomputed every time the answer is obtained from the user.

With reference again to the flowchart of FIG. 2, the question generator 103 is controlled by the dialog controller 102 at step S5, questions are presented to the user in the order that was decided at step S4, and the object of the search is narrowed down. For example, if the order in which the questions are presented has been decided to be (1) broadcast time period, (2) channel and (3) category, then the following dialog takes place between the system and the user:

System: What time is the program?
User: 9:00 PM
System: Today there are 20 programs in the 9:00 PM time period. What is the channel?
User: Channel 9.
System: There are two programs on Channel 9 in the 9:00 PM time period. What is the category?
User: Drama.
System: The drama on Channel 9 in the 9:00 PM period is "XXX". Do you wish to preselect this program for recording?
User: Yes.
System: Programming has been completed.

Next, at step S6, the object (e.g., the name of the program) is finalized from the result of dialog at step S5. In a case where a single candidate is decided merely by questions prepared beforehand in the manner described above, this is finalized as, e.g., a program preselected for recording. Further, if, when objects are narrowed down, a certain threshold value is set and objects have been narrowed down to a number of programs that is less than the threshold value, dialog may be suspended at this point, each candidate may be presented and the user may be allowed to select a candidate directly. Dialog in a case where the threshold value is three is as follows, by way of example:

System: What time is the program?
User: 9:00 PM
System: Today there are 20 programs in the 9:00 PM time period. What is the channel?
User: Channel 9.
System: There are two programs on Channel 9 in the 9:00 PM time period. Is "XXX" the one you wish?
User: No.
System: Then is "YYY" the one you wish?
User: Yes.
System: Then "YYY" will be preselected for recording.

Further, in a case where candidates are not narrowed down to a value below the threshold value by the previously prepared questions, all candidates are presented to the user and the user is made to select a candidate. This information relating to an object thus finalized is transmitted from the dialog controller 102 to the programming unit 108.

Next, at step S7, the programming unit 108, which has received the information relating to the finalized object from the dialog controller 102, activates an application based upon this information (i.e., controls the VCR 109 to perform recording).

Thus, in accordance with the first embodiment described above, broadcast programs that are to be searched are classified according to the program attribute such as broadcast time period, channel and category, etc., and the entropy of each class is calculated, and programs to be searched are narrowed down by presenting questions in order of classes of decreasing entropy. As a result, the search narrowing-down effect is enhanced and search time can be shortened.

In the first embodiment, a microphone is used to input voice to the voice recognizer 101 and a speaker is used to output speech synthesized by the speech synthesizer 105. This is the usual practice. These voice input/output devices may be connected directly or remotely. For example, voice input/output may be made by telephone from a remote location. Further, control may be exercised from a remote location by exchanging voice data with a terminal connected to a network.

Further, data to be searched stored in memory 107 may be at a remote location connected by a network. The VCR 109 may also remotely located if it is interfaced so as to send and receive control signals.

Second Embodiment

In the first embodiment, the order in which questions are presented is decided in accordance with the entropy of each class calculated by the entropy calculation unit 106. In this embodiment, however, the order in which questions are presented is decided in accordance with pronunciation distance of each class.

Figure 4:
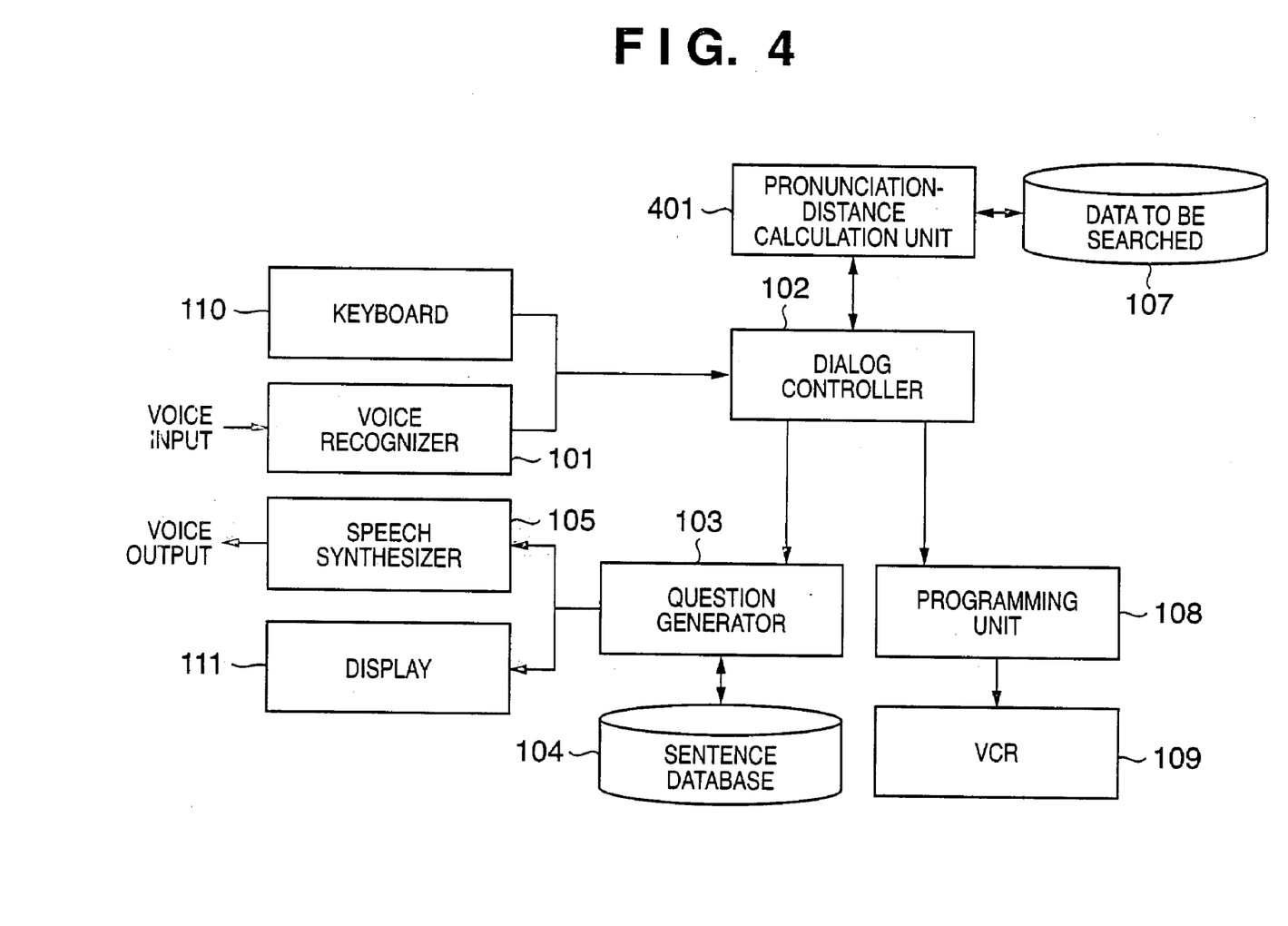
FIG. 4 is a block diagram illustrating the configuration of an interactive system according to a second embodiment of the present invention.

FIG. 4 is a block diagram illustrating the configuration of an interactive system according to a second embodiment of the present invention.

The configuration of this system is substantially similar to that of the interactive system of FIG. 1. Blocks similar to those of FIG. 1 are designated by like reference characters and need not be described again. FIG. 4 differs from FIG. 1 in that a pronunciation-distance calculation unit 401 is provided instead of the entropy calculation unit 106.

Accordingly, the operation of the interactive system in this embodiment is substantially the same as that shown in the flowchart of FIG. 2; only the processing of step S4 is different. The processing that is substituted for step S4 will be described with reference to the flowchart of FIG. 5. It should be noted that this embodiment is premised on use of the voice recognizer 101 rather than the keyboard 110 as the input means.

Figure 5:
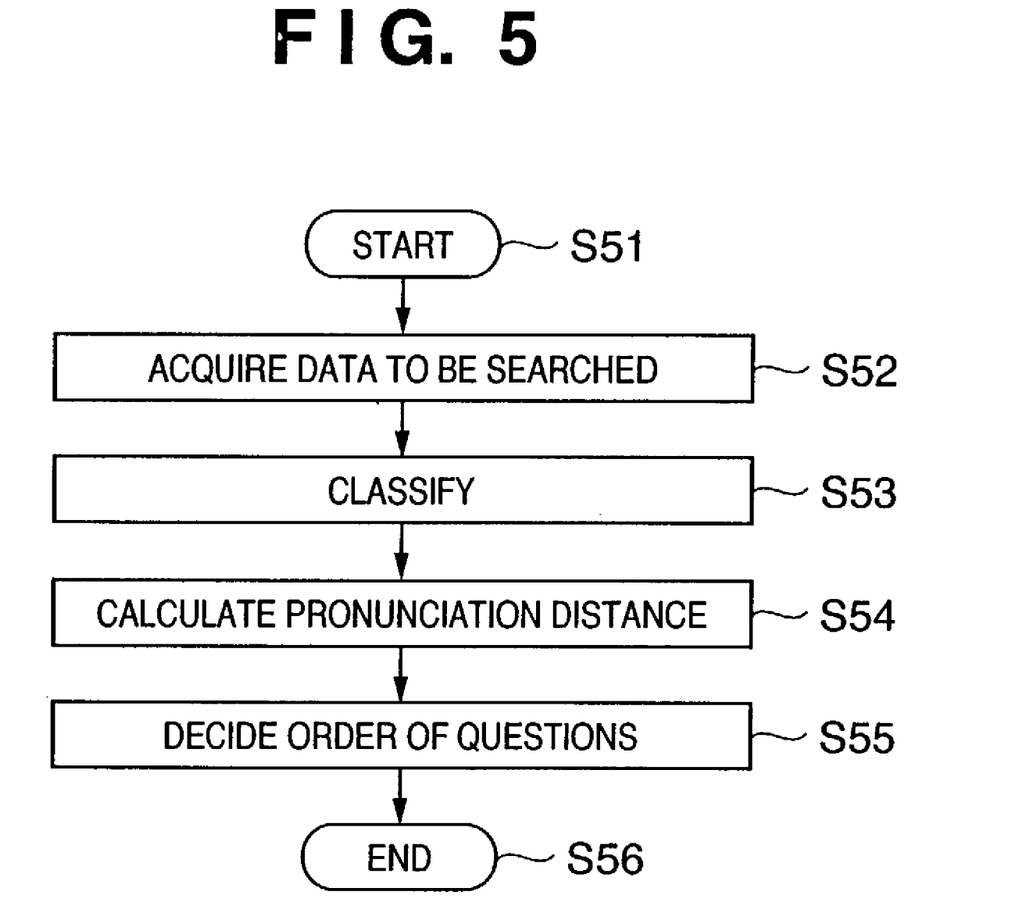
FIG. 5 is a flowchart illustrating an example of processing for calculating a dialog strategy according to the second embodiment.

FIG. 5 is a flowchart illustrating the details of calculation regarding the dialog strategy performed by the pronunciation-distance calculation unit 401.

First, at step S52, data that is to be searched is acquired from the memory 107. The data to be searched in this embodiment corresponds to a listing of TV programs. Words representing program attributes (attribute words) such as broadcast times (starting time and end time), channel and category, are appended to each program.

Next, at step S53, each program is classified on the basis of each attribute based upon the attribute words. For example, with regard to the broadcast time period as the attribute, programs are classified into programs of the five o'clock period (the attribute word is "five"), six o'clock period (the attribute word is "six"), and so on. Classification is performed in similar fashion with regard to the other attribute such as channel and category.

Next, at step S54, a pronunciation-distance calculation is performed for every class based upon the result of classification made at step S53. Various definitions of pronunciation distance may be considered. Here the distances between phonemes contained in each recognition object word will be used. In this embodiment, the attribute words such as "five" and "six" become the recognition object words.

First, a table of phoneme distances is created. Within a range of 0 to 1, a small value is assigned if phonemes resemble each other and a large value is assigned if phonemes do not resemble each other, and distances are given for all pairs of phonemes. The numerical value of a distance is given as follows, by way of example: Phoneme recognition is performed by the voice recognizer 101 and a phoneme confusion matrix is created. Phonemes between which there is great confusion give small distances and phonemes between which there is little confusion give large distances. These distances are normalized in the range of 0 to 1 and the distance between identical phonemes is made 0.

The distances between the recognition object words are found using the phoneme distance table above. As described above, in this embodiment, the recognition object words correspond to the attribute words; therefore, the recognition object word is described as the attribute word in the following description. Each attribute word is represented by a phonemic symbol string, DP matching is carried out between the phonemic symbols and the distances are accumulated, thereby finding the distances between each of the spoken utterances. The pronunciation distance of an applicable class is stipulated by, e.g., the average of the distances between each of the attribute words belonging to the class. Alternatively, in a case where it is considered that only attribute words having short distances tend to give rise to erroneous recognition, N-number of high-order attribute word pairs of short distances may be selected and the pronunciation distance of the class may be stipulated by the average of only the N-number of high-order distances.

Next, at step S55, the pronunciation distances of the respective classes are compared in size based upon the result of calculation at step S54 and the question presenting order is decided so that the questions are presented in order of classes of decreasing pronunciation distance. This ends the calculation of dialog strategy.

It should be noted that the calculation of dialog strategy at step S54 may be executed at any time, such as when the system is booted up, regardless of the sequence shown in the flowchart of FIG. 5 so long as this is done before the user performs program preselection. Furthermore, the dialog strategy at step S54 may be recomputed every time the answer is obtained from the user.

The processing from step S55 onward is executed as described in the first embodiment.

In accordance with the second embodiment, an attribute word of the class for which the pronunciation distance is large is considered to involve less erroneous recognition and questions are posed from attribute for which there seems to be little erroneous recognition. This makes it possible to reduce the number of times erroneous recognition occurs and, hence, to shorten the time needed to correct erroneous recognition.

Third Embodiment

In the first embodiment, entropy is used as method of obtaining the order in which questions are presented. In the second embodiment, the order of questions is decided using pronunciation distance. In a third embodiment, both of these methods are used. This will now be described.

Figure 6:
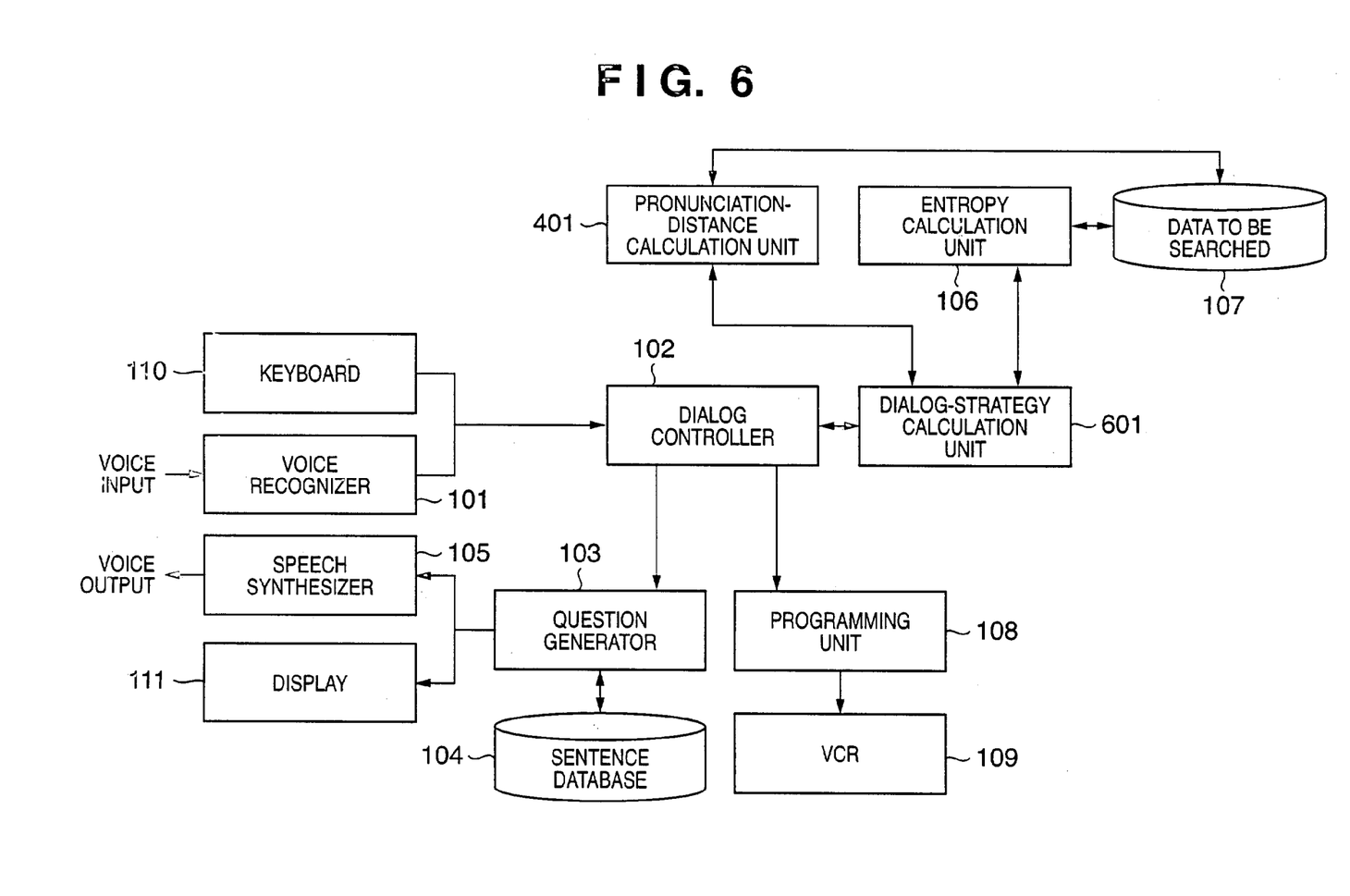
FIG. 6 is a block diagram illustrating the configuration of an interactive system according to a third embodiment of the present invention.

FIG. 6 is a block diagram illustrating the configuration of an interactive system according to a third embodiment of the present invention.

The configuration of this system is substantially similar to that of the interactive system of FIG. 1 or FIG. 2. Blocks similar to those of FIGS. 1 and 2 are designated by like reference characters and need not be described again. The interactive system shown in FIG. 6 not only has the entropy calculation unit 106 of FIG. 1 but is also provided with the pronunciation-distance calculation unit 401 of FIG. 4 and with a dialog-strategy calculation unit 601.

In this embodiment, the dialog-strategy calculation unit 601 decides the order of questions using the results of calculation of both pronunciation distance calculated by the pronunciation-distance calculation unit 401 and entropy calculated by the entropy calculation unit 106. Specifically, this embodiment applies weighting to these two numerical values, calculates a numerical value that takes both weighted values into consideration and utilizes this numerical value to decide the order of questions.

For example, with regard to a class C(j), let D(C(j)) represent a pronunciation distance calculated by the pronunciation-distance calculation unit 401, and let H(C(j)) represent entropy calculated by the entropy calculation unit 106. Calculation is performed as indicated by the following equation:

$$T(C(j)) = \alpha \cdot D(C(j)) + (1-\alpha) \cdot H(C(j)) \quad (3)$$

where a $(0 \leq \alpha \leq 1)$ represents a weighting coefficient. A case where $\alpha$ is 0 is equivalent to one where only entropy is taken in account, and a case where $\alpha$ is 1 is equivalent to one where only pronunciation distance is taken in account. Specifying the value of $\alpha$ makes it possible to decide whether to take entropy into greater consideration or take pronunciation distance into greater consideration. The value of $\alpha$ may be specified by using a value stipulated by the system or by additionally providing $\alpha$ input means and having the user enter $\alpha$. The order in which questions are presented is decided in order of classes of decreasing T(C(j)) based upon the result of the above-described calculation.

Fourth Embodiment

The foregoing embodiments have been described assuming an interactive system that is system driven. However, some of the dialog may be user driven. In such case it would be possible for the user to make an input that is at variance with the order of the questions decided by the system. In this case it would suffice if the system decides the order upon calculating entropy or pronunciation distance question by question.

For example, consider an example of dialog for a case where the initial utterance (a first utterance) from the user in the dialog is entered at the initiative of the user. After this first utterance, the order of questions will be decided upon by calculating entropy and/or pronunciation distance. In this example, the order decided would be broadcast time period, channel and category if there were no first utterance. However, the channel is decided and entropy becomes 0 owing to the first utterance. After the first question, therefore, a channel-related question becomes unnecessary and questioning is performed in the order of broadcast time period and category. The dialog in this example is as follows:

System: This is your programming system. Please make an entry.

User: Channel 9.

System: Channel 9 is understood. What time is the program?

User: 9:00 PM.

System: There are two programs on Channel 9 in the 9:00 PM time period. What is the category?

User: Drama.

System: The drama on Channel 9 in the 9:00 PM period is "XXX". Do you wish to preselect this program for recording?

User: Yes.

System: Programming has been completed.

In the above example, the first utterance is spoken at the initiative of the user. However, by calculating entropy and pronunciation distance every time a question is posed, a user-driven utterance may be made at any time. Further, in a case where the answer to the first question is a different channel in the above example, there is also the possibility that questions may be interchanged in terms of their order because the entropy calculated when the classification is done by the broadcast time period and category will differ channel by channel.

In accordance with the embodiments described above, the number of items searched can be narrowed down in a short period of time in an interactive system by changing the order in which questions are presented by the system. In the case where entropy calculation is used, it is possible to narrow down the number of items searched with less systematic error. If pronunciation distance calculation is used, a greater reduction in the number of times erroneous recognition occurs can be expected. As a result, less time is needed to correct erroneous recognition and the number of items searched can be narrowed down more quickly. Furthermore, both entropy calculation and pronunciation distance calculation can be used conjointly to provide an even greater effect.

Other Embodiments

Embodiments of the present invention have been described in detail above. The present invention can be applied to a system constituted by a plurality of devices (e.g., a host computer, interface, reader, printer, etc.) or to an apparatus comprising a single device (e.g., a copier or facsimile machine, etc.).

Furthermore, there are cases where the object of the invention is attained also by supplying a software program, which implements the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also implement the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or print data supplied to an operating system, etc., does not matter.

Examples of storage media that can be used for supplying the program are a floppy disk, optical disk (CD-ROM, CD-R, CD-RW, DVD, etc.), magneto-optical disk, magnetic tape and memory card, etc.

As for the method of supplying the program, the program of the present invention may be acquired by file transfer via the Internet.

Further, it is also possible to store the program of the present invention on a storage medium such as a CD-ROM upon encrypting the program, distribute the storage medium to users, allow users who meet certain requirements to acquire decryption key information via the Internet, and allow these users to run the encrypted program by using the key information, whereby the program can be installed in the user's computer and implemented.

Further, the program of the present invention can be encrypted, stored on a storage medium such as a CD-ROM and distributed to users. A user who satisfies certain requirements can be allowed to acquire key information, which is for decrypting the program, via the Internet, the encrypted program can be executed using this key information and the program can be installed in a computer and executed.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

Thus, in accordance with the present invention, as described above, it is possible to provide an interactive system and a method of controlling the same for achieving a task more efficiently.

The present invention is not limited to the above embodiments and various changes and modifications can be made within the spirit and scope of the present invention. Therefore, to apprise the public of the scope of the present invention, the following claims are made.

What is claimed is:

1. An interactive system for achieving a prescribed task by conducting a data search based upon information exchanged interactively, comprising:
   first memory means for storing a database containing data, each item of data having a plurality of attributes and a plurality of values assigned to the plurality of attributes, respectively, each attribute being associated with a set of attribute words representing the values, respectively, that can be assigned to the associated attribute;

second memory means for storing a plurality of questions about the attribute words;

classification means for classifying the data contained in the database stored in said first memory means into classes corresponding to the attribute words representing the values assigned to the attributes of the data;

pronunciation distance calculation means for calculating a pronunciation distance of each set of attribute words associated with a given attribute, based on phonemic distances between the attribute words of the set of attribute words associated with the given attribute;

decision means for deciding an order of presenting the questions stored in said second memory means in order of the attributes associated with sets of attribute words having decreasing pronunciation distance;

presentation means for presenting the questions in the order that has been decided by said decision means;

speech recognition means for recognizing speech entered in response to a presented question;

narrowing means for limiting the data to be searched in the database stored in said first memory means to data having a value represented by an attribute word that is a word that has been recognized by said speech recognition means; and entropy calculation means for calculating an entropy of each attribute, wherein said decision means decides the order of presenting the questions stored in said second memory means in order of the attributes having decreasing value of a weighted sum of the pronunciation distance calculated by said pronunciation distance calculation means and the entropy calculated by said entropy calculation means.

2. A method of controlling an interactive system for achieving a prescribed task by conducting a data search based upon information exchanged interactively, the system having a first memory for storing a database containing data, each item of data having a plurality of attributes and a plurality of values assigned to the plurality of attributes, respectively, each attribute being associated with a set of attribute words representing the values, respectively, that can be assigned to the associated attribute, and a second memory for storing a plurality of questions about the attribute words, the method comprising the steps of:

classifying the data contained in the database stored in the first memory into classes corresponding to the attribute words representing the values assigned to the attributes of the data;

calculating a pronunciation distance of each set of attribute words associated with a given attribute, based on phonemic distances between the attribute words of the set of attribute words associated with the given attribute;

deciding an order of presenting the questions stored in the second memory in order of the attributes associated with sets of attribute words having decreasing pronunciation distance;

presenting questions in the decided order;

recognizing speech entered in response to a presented question;

limiting the data to be searched in the database stored in the first memory to data having a value represented by an attribute word that is a word that has been recognized in said step of recognizing speech; and calculating an entropy of each attribute, wherein in said deciding step the order of presenting the questions stored in the second memory is decided in order of the attributes having decreasing value of a weighted sum of the pronunciation distance calculated in said pronunciation distance calculating step and the entropy calculated in said entropy calculating step.

3. A program, embodied in a computer-readable medium, for controlling an interactive system for achieving a prescribed task by conducting a data search based upon information exchanged interactively, the system having a processor for executing the program, a first memory for storing a database containing data, each item of data having a plurality of attributes and a plurality of values assigned to the plurality of attributes, respectively, each attribute being associated with a set of attribute words representing the values, respectively, that can be assigned to the associated attribute, and a second memory for storing a plurality of questions about the attribute words, the program comprising program code for causing the processor to perform the steps of:

classifying the data contained in the database stored in the first memory into classes corresponding to the attribute words representing the values assigned to the attributes of the data;

calculating a pronunciation distance of each set of attribute words associated with a given attribute, based on phonemic distances between the attribute words of the set of attribute words associated with the given attribute;

deciding an order of presenting the questions stored in the second memory in order of the attributes associated with sets of attribute words having decreasing pronunciation distance;

presenting questions in the decided order;

recognizing speech entered in response to a presented question;

limiting the data to be searched in the database stored in the first memory to data having a value represented by an attribute word that is a word that has been recognized in the step of recognizing speech; and calculating an entropy of each attribute, wherein in said deciding step the order of presenting the questions stored in the second memory is decided in order of the attributes having decreasing value of a weighted sum of the pronunciation distance calculated in said pronunciation distance calculating step and the entropy calculated in said entropy calculating step.

* * * * *

UNITED STATES PATENT AND TRADEMARK OFFICE
CERTIFICATE OF CORRECTION

PATENT NO. : 7,260,531 B2  Page 1 of 1
APPLICATION NO. : 10/376318
DATED : August 21, 2007
INVENTOR(S) : Kosaka et al.

It is certified that error appears in the above-identified patent and that said Letters Patent is hereby corrected as shown below:

COLUMN 2:
Line 56, "provide" should read --to provide--.

COLUMN 4:
Line 9, "so adapted" should read --adapted so--.

COLUMN 5:
Line 41, "PM" should read --PM.--.
Line 66, "PM" should read --PM.--.

COLUMN 6:
Line 40, "remotely" should read --be remotely--.

COLUMN 8:
Line 14, "method" should read --a method--.
Line 50, "in" should read --into--.
Line 51, "in" should read --into--.
Line 65, "case" should read --a case--.

Signed and Sealed this

Twentieth Day of May, 2008

JON W. DUDAS
*Director of the United States Patent and Trademark Office*